United States Patent
Liu et al.

(10) Patent No.: US 11,651,255 B2
(45) Date of Patent: May 16, 2023

(54) METHOD AND APPARATUS FOR OBJECT PREFERENCE PREDICTION, AND COMPUTER READABLE MEDIUM

(71) Applicant: BEIJING CENTURY TAL EDUCATION TECHNOLOGY CO., Beijing (CN)

(72) Inventors: Tianqiao Liu, Beijing (CN); Zitao Liu, Beijing (CN); Songfan Yang, Beijing (CN); Yan Huang, Beijing (CN); Bangxin Zhang, Beijing (CN)

(73) Assignee: BEIJING CENTURY TAL EDUCATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/419,152

(22) PCT Filed: Dec. 17, 2019

(86) PCT No.: PCT/CN2019/125866
§ 371 (c)(1),
(2) Date: Jun. 28, 2021

(87) PCT Pub. No.: WO2020/135144
PCT Pub. Date: Jul. 2, 2020

(65) Prior Publication Data
US 2022/0044137 A1    Feb. 10, 2022

(30) Foreign Application Priority Data
Dec. 29, 2018  (CN) .......................... 201811653933.5

(51) Int. Cl.
*G06N 5/04*      (2023.01)
*G06F 17/16*     (2006.01)
*G06Q 30/0601*   (2023.01)

(52) U.S. Cl.
CPC ............... *G06N 5/04* (2013.01); *G06F 17/16* (2013.01); *G06Q 30/0631* (2013.01)

(58) Field of Classification Search
CPC ....................................................... G02F 1/21
See application file for complete search history.

(56) References Cited

U.S. PATENT DOCUMENTS 8,484,208 B1 *  7/2013  Raghavan ............. G06F 16/248
                                               707/728
8,805,757 B2    8/2014  Sekino
(Continued)

FOREIGN PATENT DOCUMENTS

CN    102254028    11/2011
CN    102982107    3/2013
(Continued)

OTHER PUBLICATIONS

"Elements of Neural Networks" Mehrotra, 1997 MIT press.*
(Continued)

*Primary Examiner* — Michael J Huntley
*Assistant Examiner* — Peter D Coughlan
(74) *Attorney, Agent, or Firm* — Dority & Manning, PA

(57) ABSTRACT

The present disclosure relates to a method and an apparatus for object preference prediction, and a computer readable medium. The method includes: acquiring evaluation information indicating preference values of partial users in a user set for partial objects in an object set; acquiring auxiliary information of at least one of the user set and the object set, wherein the auxiliary information indicates an attribute of at least one of a corresponding user in the user set and a corresponding object in the object set; determining a user feature representation and an object feature representation using a matrix decomposition model, based on the evaluation information and the auxiliary information; and deter-
(Continued)

mining a preference prediction value of a target user in the user set for a target object in the object set based on the user feature representation and the object feature representation.

17 Claims, 6 Drawing Sheets

(56) References Cited

U.S. PATENT DOCUMENTS

| | | | |
|---|---|---|---|
| 9,275,116 B2 | 3/2016 | Sekino | |
| 10,127,596 B1* | 11/2018 | Franke | G06Q 30/0631 |
| 2008/0262945 A1* | 10/2008 | Clark | G06F 16/86 |
| | | | 707/999.005 |
| 2011/0302126 A1 | 12/2011 | Sekino | |
| 2014/0358755 A1 | 12/2014 | Sekino | |
| 2016/0364234 A1* | 12/2016 | DiMascio | G06Q 10/06 |
| 2017/0206581 A1* | 7/2017 | Feierfeil | G06Q 30/0631 |
| 2017/0301001 A1* | 10/2017 | Wilkinson | G06Q 30/0269 |
| 2018/0005161 A1* | 1/2018 | Cong | G06Q 10/06398 |
| 2018/0047036 A1 | 2/2018 | Zhang et al. | |
| 2018/0096247 A1* | 4/2018 | Maruhashi | G06N 3/084 |
| 2018/0121986 A1* | 5/2018 | Akkiraju | G06Q 30/0631 |
| 2018/0342004 A1 | 11/2018 | Yom-Tov et al. | |

FOREIGN PATENT DOCUMENTS

| | | |
|---|---|---|
| CN | 103399858 | 11/2013 |
| CN | 104077351 | 10/2014 |
| CN | 106294758 | 1/2017 |
| CN | 107016058 | 8/2017 |
| CN | 108416628 | 8/2018 |
| CN | 108665308 | 10/2018 |
| CN | 109726331 | 5/2019 |

OTHER PUBLICATIONS

PCT International Search Report (w/ English translation) for corresponding PCT Application No. PCT/CN2019/125866, dated Mar. 24, 2020, 9 pages.

Chinese First Office Action (w/ English translation) for corresponding CN Application No. 201811653933.5, dated Jul. 3, 2020, 13 pages.

Chinese Second Office Action (w/ English translation) corresponding CN Application No. 201811653933.5, dated Dec. 11, 2020, 13 pages.

* cited by examiner

METHOD AND APPARATUS FOR OBJECT PREFERENCE PREDICTION, AND COMPUTER READABLE MEDIUM

CROSS-REFERENCE TO RELATED APPLICATIONS

This application is a national stage application of PCT International Application No. PCT/CN2019/125866, filed on Dec. 17, 2019, which is hereby incorporated by reference in its entirety.

This application claims a priority of the Chinese patent application with the application No. 201811653933.5, filed on Dec. 29, 2018, and entitled "Method and Apparatus for Object Preference Prediction, and Computer Readable Medium", the entire contents of which are incorporated herein by reference.

TECHNICAL FIELD

Embodiments of the present disclosure relate to the field of artificial intelligence, and more particularly, to a method and an apparatus for object preference prediction, and a computer readable medium.

BACKGROUND

With the rapid development of Internet technology, the Internet will produce a large amount of new contents every day. A user is eager to be able to timely and accurately select the required information content from the massive contents. In recent years, Personalized Recommender Services (PRS) technology has developed rapidly, which can infer a user's preference based on the information of the user and/or an object, and then recommend the information conforming to the user's interest preference according to the interest preference of the user.

A common recommendation approach is to make recommendation based on prediction of a user's preference for an object. However, there are often a plurality of users and a plurality of objects in such a recommendation process, but only partial users' preferences for partial objects can be obtained. Therefore, how to more accurately infer a user's preference for an object based on the user's existing preference value for the object becomes the current focus of attention.

SUMMARY OF THE INVENTION

Embodiments of the present disclosure provide a scheme for object preference prediction.

According to a first aspect of the present disclosure, a method for object preference prediction is proposed. The method includes: acquiring evaluation information indicating preference values of partial users in a user set for partial objects in an object set; acquiring auxiliary information of at least one of the user set and the object set, wherein the auxiliary information indicates an attribute of at least one of a corresponding user in the user set and a corresponding object in the object set; determining a user feature representation and an object feature representation using a matrix decomposition model, based on the evaluation information and the auxiliary information; and determining a preference prediction value of a target user in the user set for a target object in the object set based on the user feature representation and the object feature representation, wherein a preference value of the target user for the target object is not indicated in the evaluation information.

According to a second aspect of the present disclosure, an apparatus for object preference prediction is proposed. The apparatus includes: an evaluation information acquiring module configured to acquire evaluation information indicating preference values of partial users in a user set for partial objects in an object set; an auxiliary information acquiring module configured to acquire auxiliary information of at least one of the user set and the object set, wherein the auxiliary information indicates an attribute of at least one of a corresponding user in the user set and a corresponding object in the object set; a feature representation determining module configured to determine a user feature representation and an object feature representation using a matrix decomposition model, based on the evaluation information and the auxiliary information; and a preference prediction determining module configured to determine a preference prediction value of a target user in the user set for a target object in the object set based on the user feature representation and the object feature representation, wherein a preference value of the target user for the target object is not indicated in the evaluation information.

In a third aspect of the present disclosure, a computer readable storage medium is provided. The computer readable storage medium has computer readable program instructions stored thereon for executing the method described in accordance with the first aspect.

BRIEF DESCRIPTION OF THE DRAWINGS

The foregoing and other objects, features, and advantages of the present disclosure will become more apparent from a more detailed description of exemplary embodiments of the present disclosure taken in conjunction with the accompanying drawings, in which, the same reference numbers generally refer to the same components.

DETAILED DESCRIPTION OF THE PREFERRED EMBODIMENTS

Figure 1:
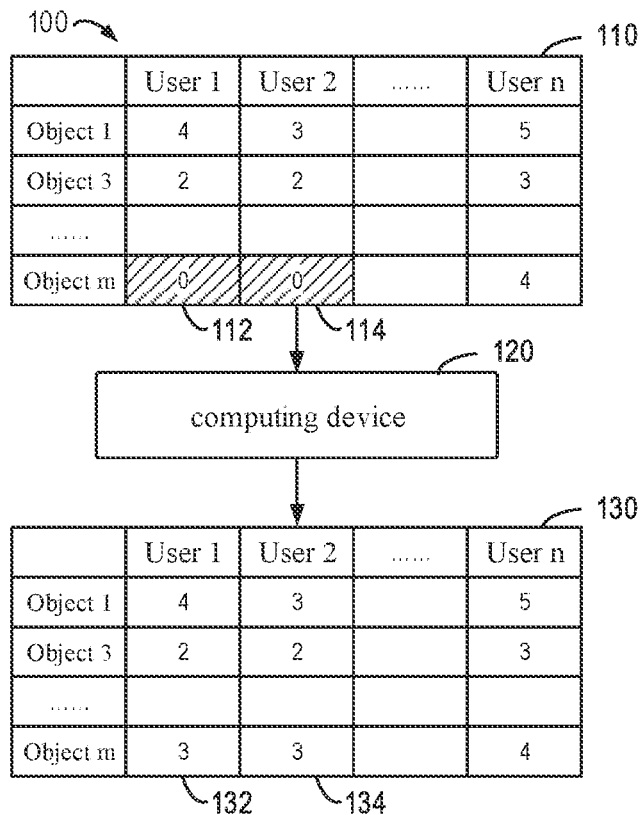
FIG. 1 illustrates a schematic diagram of an environment that may be used to implement an embodiment of the present disclosure.

Preferred embodiments of the present disclosure will be described in more detail below with reference to the accompanying drawings. Although the preferred embodiments of the present disclosure are shown in the drawings, it should be understood that the present disclosure may be implemented in various forms and should not be limited by the embodiments set forth herein. Rather, the embodiments are provided to make the present disclosure more thorough and complete, and to fully convey the scope of the present disclosure to those skilled in the art.

As used herein, the term "including" and variations thereof refers to open-ended including, i.e., "including but not limited to". Unless specifically stated, the term "or" means "and/or". The term "based on" means "at least partially based on". The terms "an exemplary embodiment" and "an embodiment" mean "at least one exemplary embodiment". The term "another embodiment" means "at least one further embodiment". The terms "first", "second" and the like may refer to different or identical objects. Other explicit and implicit definitions may also be included below.

As discussed above, an object preference evaluation may be determined based on a user's existing preference value for an object, and the estimation may be performed, for example, based on known preferences of the user for other objects and/or known preferences of other users for some objects. In practical applications, a user may actively provide scoring information for some objects, and such scoring information reflects the user's preference for the objects. For example, when the user purchases and uses certain commodities, the user may submit a preference value for the commodities on a shopping website. However, such information is often not comprehensive for a recommendation system, making it difficult to provide a user with a comprehensive and accurate object recommendation. For example, when a target user provides a preference value only for a specific object among a plurality of objects, it is difficult for the recommendation system to determine whether the target user has a preference for other unscored objects, and thus an accurate recommendation cannot be given.

According to an embodiment of the present disclosure, a scheme for object preference prediction is provided. In the scheme, evaluation information indicating preference values of partial users in a user set for partial objects in an object set is acquired. Subsequently, auxiliary information of at least one of the user set and the object set is acquired, wherein the auxiliary information indicates an attribute of at least one of a corresponding user in the user set and a corresponding object in the object set. Subsequently, a user feature representation and an object feature representation are determined using a matrix decomposition model, based on the evaluation information and the auxiliary information. Then, a preference prediction value of a target user in the user set for a target object in the object set is determined based on the user feature representation and the object feature representation, wherein a preference value of the target user for the target object is not indicated in the evaluation information. Based on such a method, the auxiliary information of at least one of the user set and the object set may be considered in the recommendation process, and the preference value of the target user for the target object, which is not indicated in the evaluation information, is estimated more accurately based on such auxiliary information, thereby realizing more accurate object recommendation.

FIG. 1 illustrates a schematic diagram of an environment 100 that may be used to implement a method of the present disclosure. As shown in FIG. 1, the environment 100 includes a computing device 120 that may be used to implement object preference prediction in various implementations of the present disclosure. The computing device 120 is capable of receiving evaluation information 110. In some embodiments, the evaluation information 110 may be represented as a preference matrix. As shown in FIG. 1, the evaluation information 110 may be preference values of n users (user 1, user 2, . . . , user n) in a user set form objects (object 1, object 2, . . . , object m, the object may be a commodity displayed or listed on a page of an Internet shopping website) in an object set, wherein the preference values are able to reflect preferences of the n users for the m objects, respectively, that is, the evaluation information 110 is represented as an n×m preference matrix. In some embodiments, the preference value may be a scoring value of a user for an object, e.g., 1 to 5 scores with a full score of 5. It should be understood that such preference values are merely exemplary and that any form of preference values known in the art may be employed.

In an actual situation, the acquired evaluation information 110 is often unable to include the preference values of all users in the user set for all objects in the object set. As shown in FIG. 1, part of the values in the preference matrix indicating the evaluation information 110 are null (exemplarily, they are represented by a value of 0 in FIG. 1). For example, both a preference value 112 of the user 1 for the object m and a preference value 114 of the user 2 for the object m are null, that is, the evaluation information 110 cannot reflect the preferences of the user 1 and the user 2 for the object m.

The computing device 120 may predict a preference value, which is not indicated in the evaluation information 110, of a target user for a target object based on the preference values, which are indicated in the evaluation information 110, of partial users for partial objects. As shown in FIG. 1, the computing device 120 may predict a null value in a preference matrix corresponding to the evaluation information 110 based on non-null values in the preference matrix, that is, it is possible to predict a preference prediction value 132 of the user 1 for the object m and a preference prediction value 134 of the user 2 for the object m. Alternatively, elements in the preference matrix corresponding to the evaluation information may all be non-null values, except that the preference matrix only includes the preference values of partial users in the user set for partial objects in the object set. The computing device 120 may predict a preference prediction value, which is not included in the preference matrix, of the target user for the target object based on the preference values, which have already been included in the preference matrix, of the partial users in the user set for the partial objects in the object set. Hereinafter, main detailed description is given as to the case that the preference matrix corresponding to the evaluation information 110 contains both non-null and null values. In some embodiments, the preference prediction value 132 and the preference prediction value 134 may be input into the preference matrix corresponding to the evaluation information 110, so as to obtain an updated preference matrix to reflect updated evaluation information 130. In some embodiments, the computing device 120 may, in turn, utilize the updated evaluation information 130 to recommend an object in the object set to a user in the user set. It should be understood that the evaluation information 110, the updated evaluation information 130 and specific values in a score matrix shown in FIG. 1 are only schematic.

Figure 2:
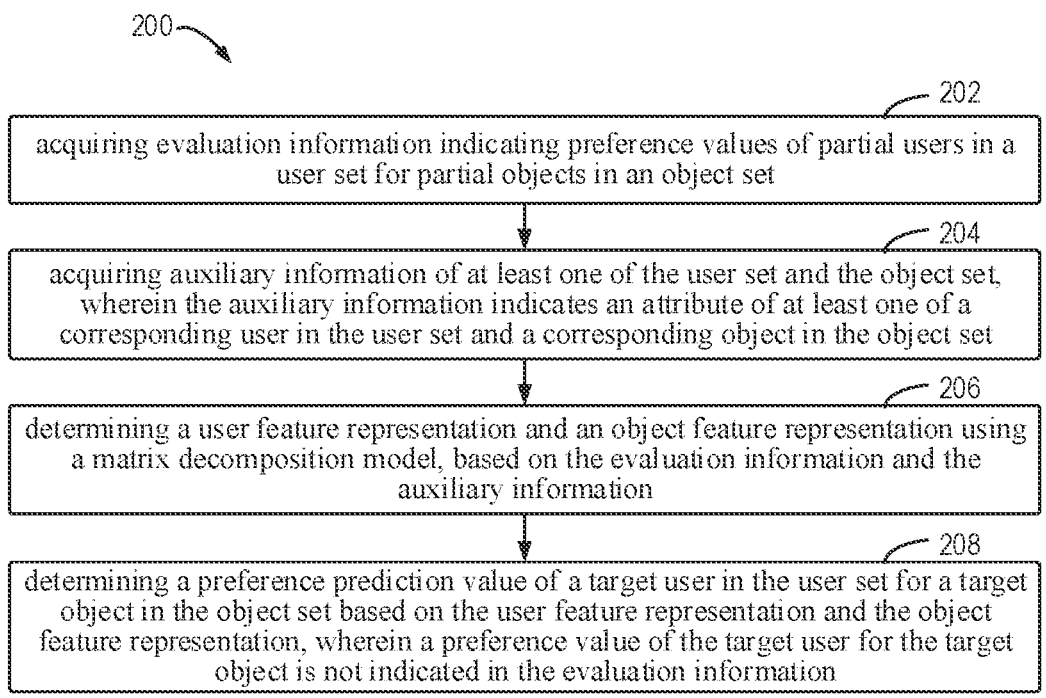
FIG. 2 illustrates a flowchart of a method for object preference prediction according to an embodiment of the present disclosure.

A scheme related to a method for object preference prediction according to embodiments of the present disclosure will be described below with reference to FIGS. 2 to 8. FIG. 2 illustrates a flowchart of a method 200 for object preference prediction according to an embodiment of the present disclosure. The method 200 may be implemented by the computing device 120 in FIG. 1. The actions involved in the method 200 will be described below in conjunction with the environment 100 described in FIG. 1.

At step 202, the computing device 120 acquire the evaluation information 110, wherein the evaluation information indicates preference values of partial users in a user set for partial objects in an object set. In some embodiments, the evaluation information 110 may be represented as a preference matrix. In the example of FIG. 1, the evaluation information 110 may be represented as a preference matrix R, wherein $R \in \mathbb{R}^{n \times m}$, which represents preference values of a plurality of users in a user set $\mathcal{U} = \{u_1, u_2, \ldots, u_n\}$ for a plurality of objects in the object set $\mathcal{V} = \{u_1, u_2, \ldots, u_3\}$. Specifically, if a user $u_i$ has a preference value for an object $v_j$, $R(i, j) > 0$ and it indicates the preference value of the user $u_i$ for the object $v_j$; otherwise, if the user $u_i$ does not have a preference value for the objects $v_j$, $R(i, j) = 0$. As shown in FIG. 1, $R(1, m) = 0$, and $R(2, m) = 0$.

In some embodiments, the computing device 120 may acquire the evaluation information 110 of the users in the user set for the objects in the object set from an Internet page. For example, there are a large number of preference values of users for objects (commodities) on pages of Internet shopping websites (such as Taobao, Jingdong and Amazon, and etc.), and the preference value of a user for an object can be extracted from these pages by using a technique well known in the art, to determine the evaluation information 110.

In some embodiments, the computing device 120 may also acquire the evaluation information 110 of the users in the user set for the objects in the object set from a comment database. For example, the comment database may be a storage that is integrated into the computing device 120 as part of the computing device 120. Alternatively, the comment database may be a storage independent of the computing device 120, which may acquire the evaluation information 110 via a wired or wireless network.

In some embodiments, the evaluation information of the users in the user set for the objects in the object set may be acquired also by sending an electronic questionnaire or a paper questionnaire to the user in the user set. It is to be understood that these ways of acquiring the evaluation information 110 are all exemplary, and the present disclosure is not intended to limit how to acquire the evaluation information 110, and the evaluation information 110 may be acquired in any suitable way in the art.

At step 204, the computing device 120 acquires auxiliary information of at least one of the user set and the object set, i.e., the computing device 120 acquires auxiliary information of at least one user in the user set and/or auxiliary information of at least one object in the object set. The auxiliary information indicates an attribute of at least one of a corresponding user in the user set and a corresponding object in the object set. That is, in a case where the computing device acquires the auxiliary information of a user in the user set, the auxiliary information indicates an attribute of the corresponding user in the user set, and in a case where the computing device acquires the auxiliary information of an object in the object set, the auxiliary information indicates an attribute of the corresponding object in the object set. According to an embodiment of the present disclosure, in addition to the acquired evaluation information 110 being able to reflect the degree of preference of a user in the user set for an object in the object set, certain attributes associated with the users in the user set and certain attributes associated with the objects in the object set can also reflect the likely degree of preference of the user for the object. For example, a user whose occupation is "a programmer" may be more interested in an object "a mechanical keyboard" than a user whose occupation is "a dancer".

Figure 3:
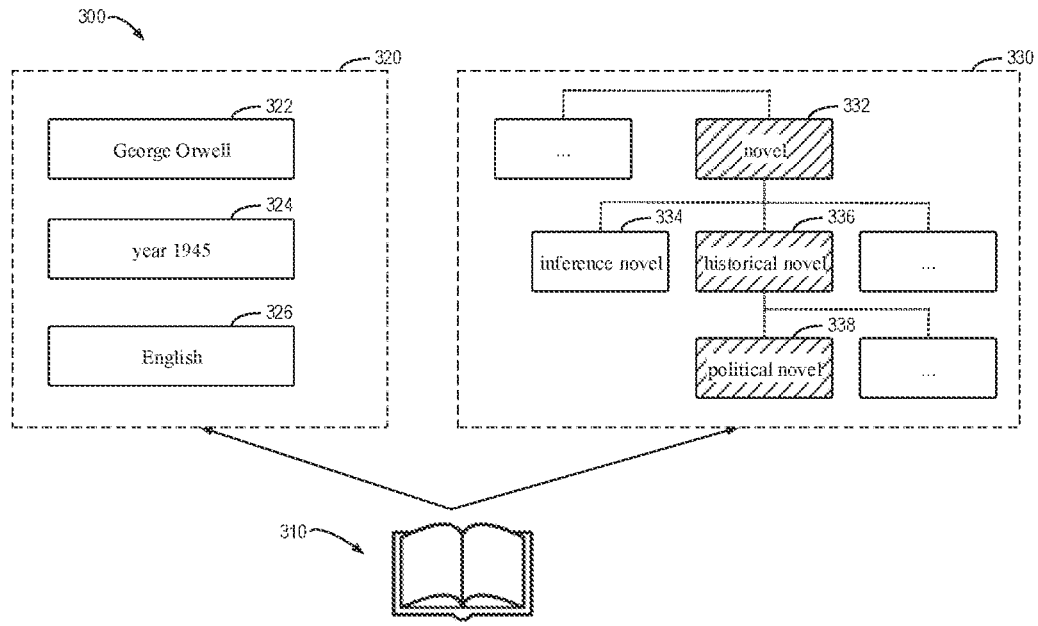
FIG. 3 illustrates a schematic diagram of example auxiliary information according to an embodiment of the present disclosure.

In some embodiments, in accordance with whether the acquired attribute can be organized into a hierarchical structure, the auxiliary information may be divided into two types: hierarchical information and non-hierarchical information. For ease of understanding, FIG. 3 illustrates a schematic diagram of example auxiliary information 300 according to an embodiment of the present disclosure. As shown in FIG. 3, in the case where an object in an object set is a book "Animal Farm" 310, the auxiliary information for the book 310 may include information about different attributes of the book 310, such as an author, a publication year, a publication language and a category, and etc. In the example of FIG. 3, there is no hierarchical relationship between an author attribute 322 ("George Orwell"), a publication year attribute 324 ("year 1945") and a publication language attribute 326 ("English") of the book 310, which constitute non-hierarchical information 320 of the book 310. Hierarchical information 330 of the book 310 may include the category to which the book 310 belongs: political novel 338, historical novel 336, and novel 332. As shown in FIG. 3, the category of the book 310 is organized into a structure as shown by the hierarchical information 330: a category (novel 332)→a subcategory (historical novel 336)→a more detailed category (political novel 338). Similarly, the auxiliary information of a user may also be classified into hierarchical information (such as a community to which the user belongs, a place of birth of the user, and the like) and non-hierarchical information (such as an age, a gender, an education level, and the like of the user).

In some embodiments, the computing device 120 may acquire the auxiliary information corresponding to a user and/or the ancillary information corresponding to an object from an Internet page. Taking a shopping website as an example, an Internet shopping website (e.g., Taobao, Jingdong, Amazon, and etc.) may list hierarchical information and non-hierarchical information of objects (commodities). Continuing with the example of FIG. 3, for example, the non-hierarchical information 320 of the book 310 may be extracted from the commodity introduction portion on the Amazon's page. In addition, some Internet shopping websites also list a plurality of categories to which the objects (commodities) belong, for example, the Amazon page shows that the book 310 falls into the following categories: novel 332→historical novel 336→political novel 338. Similarly, the computing device 120 may also acquire hierarchical information and non-hierarchical information of a user from an Internet website.

In some embodiments, the computing device 120 may also acquire the auxiliary information of a user and the ancillary information of an object from an auxiliary information database. For example, the auxiliary information database may be a storage that is integrated into the computing device 120 as part of the computing device 120. Alternatively, the auxiliary information database may also be a storage independent of the computing device 120, which may acquire the auxiliary information via a wired or wireless network. It should be understood that the above ways of acquiring the auxiliary information are merely exemplary and should not be construed as limiting, and the auxiliary information of at least one of a user set and a object set may be acquired in any suitable way.

Hereinafter, the hierarchical information and the non-hierarchical information in the auxiliary information for respective users are referred to as user hierarchical information and user non-hierarchical information, respectively. Moreover, the hierarchical information and the non-hierarchical information in the auxiliary information for respective objects are referred to as object hierarchical information and object non-hierarchical information, respectively. The auxiliary information acquired by computing device 120 may include one or more of these four types of information.

Continuing to refer to FIG. 2, at step 206, based on the acquired evaluation information 110 and auxiliary information, the computing device 120 determines a user feature representation and an object feature representation using a matrix decomposition model. In a recommendation system based on collaborative filtering, a matrix decomposition is a commonly used method for acquiring a feature representation of a user set and a feature representation of an object set. Generally, an objective function of a weighted matrix decomposition is as follows:

$$\min_{U,V} \|M \odot (R - UV)\|_F^2 + \lambda(\|U\|_F^2 + \|V\|_F^2) \quad (1)$$

wherein $M \in \mathbb{R}^{n \times m}$ represents an indication matrix of the preference matrix R associated with the evaluation information 110, if R(i, j)>0, M(i, j)=1; otherwise, M(i, j)=0. U indicates a user feature representation for a user set, which is acquired based on the matrix decomposition, and V indicates an object feature representation for an object set, which is acquired based on the matrix decomposition $U \in \mathbb{R}^{n \times d}$, and $V \in \mathbb{R}^{d \times m}$, d represents a feature dimension of a single user feature representation or object feature representation. In equation (1), $\odot$ represents a Hadamard product, and $\lambda$ represents a weight coefficient.

In the objective function shown in the equation (1), only the preference matrix corresponding to the evaluation information 110, rather than the auxiliary information for the user set or the object set, is considered in the matrix decomposition, and such recommendations are often lacking in accuracy. In an embodiment of the present disclosure, the computing device 120 may combine a preference matrix with auxiliary information, to determine more accurate recommendation information. A scheme for determining a user feature representation and an object feature representation by combining with auxiliary information for a user set and for an object set in a matrix decomposition process according to an embodiment of the present disclosure will be described below with reference to FIGS. 4 to 8.

Figure 4:
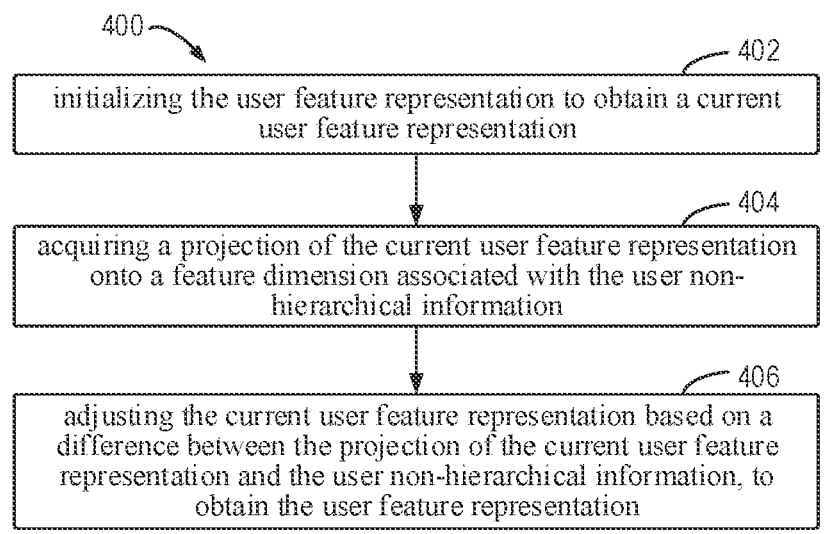
FIG. 4 illustrates a flowchart of a process of determining a user feature representation according to an embodiment of the present disclosure.

In some embodiments, the acquired auxiliary information includes user non-hierarchical information indicating non-hierarchical attributes of respective users in a user set. FIG. 4 illustrates a flowchart of a method 400 for determining a user feature representation for a user set and an object feature presentation for an object set in accordance with an embodiment of the present disclosure.

At step 402, the computing device 120 initializes the user feature representation to obtain a current user feature representation. In some embodiments, the computing device 120 may set an initialization value for the user feature representation as a starting point for adjusting a value, in a case where the objective function of the matrix decomposition is solved.

At step 404, the computing device 120 acquires a projection of the current user feature representation onto a feature dimension associated with the user non-hierarchical information. In some embodiments, the user non-hierarchical information may be represented as $X \in \mathbb{R}^{d_x \times n}$, in the process of matrix decomposition, the user feature representation U(i, :) and the non-hierarchical information X(:, i) describe the same user $u_i$, thus U(i, :) and X(:, i) should be close in the same feature space. Based on the above idea, considering the user non-hierarchical information X, the objective function of the matrix decomposition can be transformed into:

$$\min_{U,V} \|M \odot (R - UV)\|_F^2 + \lambda(\|U\|_F^2 + \|V\|_F^2) + \gamma \|S^u U^T - X\|_F^2 \quad (2)$$

wherein $S^u \in \mathbb{R}^{d_x \times d}$ represents a projection matrix that projects the user feature representation U onto the same feature dimension as the user non-hierarchical information X, and $\gamma$ represents a corresponding weight coefficient. In the matrix decomposition process, the computing device 120 needs to solve $S^u$ so that the projection $S^u U^T$ of the user feature representation U on the same feature dimension as the user non-hierarchical information X is at a minimum distance from the user non-hierarchical information X.

At step 406, the computing device 120 adjusts the current user feature representation based on a difference between the projection of the current user feature representation and the user non-hierarchical information, to obtain the user feature representation. In some embodiments, in the process of solving the objective function (2), the computing device 120 may employ a gradient descent method to reduce the difference between the projection $S^u U^T$ of the adjusted user feature representation and the user non-hierarchical information X, thereby causing the value of the objective function (2) to decrease until a convergence condition is satisfied. In some embodiments, the convergence condition may be that the value of the objective function (2) is smaller than a predetermined threshold. In some embodiments, the convergence condition may be that the number of adjustment exceeds the number of thresholds. In some embodiments, the convergence condition may also be that the difference between the objective functions before and after the adjustment of the parameter is judged to be smaller than a predetermined threshold.

In response to determining that the objective function (2) satisfies the convergence condition, the computing device 120 may output the corresponding user feature representation U and object feature representation V. At this time, not only that a Hadamard product of the user feature representation U and the object feature representation V needs to be close enough to the preference matrix R, but also that the value of the user feature representation U in the same feature dimension should be close to the known user non-hierarchical information X, are considered in the matrix decomposition.

In some embodiments, considering that the user non-hierarchical information X is generally sparse, the computing device 120 may utilize a marginalized denoising autoencoder (MDA) to process the user non-hierarchical information X. In some embodiments, the computing device 120 may utilize a single mapping $W^u$; $\mathbb{R}^{d_x} \to \mathbb{R}^{d_x}$ to reconstruct the user non-hierarchical information X=[$x_1$, $x_2$, ..., $x_n$], and in particular, a reconstructed loss function may be represented as:

$$\mathcal{L}(W^u) = \frac{1}{2n} \sum_{i=1}^{n} \|x_i - W^u \tilde{x}_i\|^2 \quad (3)$$

wherein $\tilde{x}_i$ represents a noisy version for each user $u_i$. In order to avoid random scrambling of a feature causing $W^u$ to vary too much, the computing device 120 may use k times of scrambling, thus the loss function (3) may be updated as:

$$\mathcal{L}(W^u) = \frac{1}{2nk} \sum_{j=1}^{k} \sum_{i=1}^{n} \|x_i - W^u \tilde{x}_{i,j}\|^2 \quad (4)$$

wherein $\tilde{x}_{i,j}$ represents the scrambled version of the feature $x_i$ at the j-th time. The loss function (4) may also be expressed in a matrix form as:

$$\mathcal{L}(W^u) = \frac{1}{2nk} \|\overline{X} - W^u \tilde{X}\|_F^2 \quad (5)$$

wherein $\overline{X} = |X, X, \ldots, X| \in \mathbb{R}^{d_x \times nk}$, $\tilde{X} = [\tilde{X}_1, \tilde{X}_2, \ldots, \tilde{X}_k] \in \mathbb{R}^{d_x \times nk}$, and $\overline{X}_j$ and represents the j-th noisy version of the original feature X. Accordingly, the objective function (2) of the matrix decomposition may be represented as:

$$\min_{U,V,S^u,W^u} \|M \odot (R - UV)\|_F^2 + \quad (6)$$
$$\lambda(\|U\|_F^2 + \|V\|_F^2) + \gamma(\|S^u U^T - W^u X\|_F^2 + \|\overline{X} - W^u \tilde{X}\|_F^2)$$

In the objective function (6), the computing device 120 further introduces self-encoding information in the matrix decomposition process, thereby avoiding the problem that the user non-hierarchical feature X is too sparse, and further improving the accuracy of the recommendation.

Figure 5:
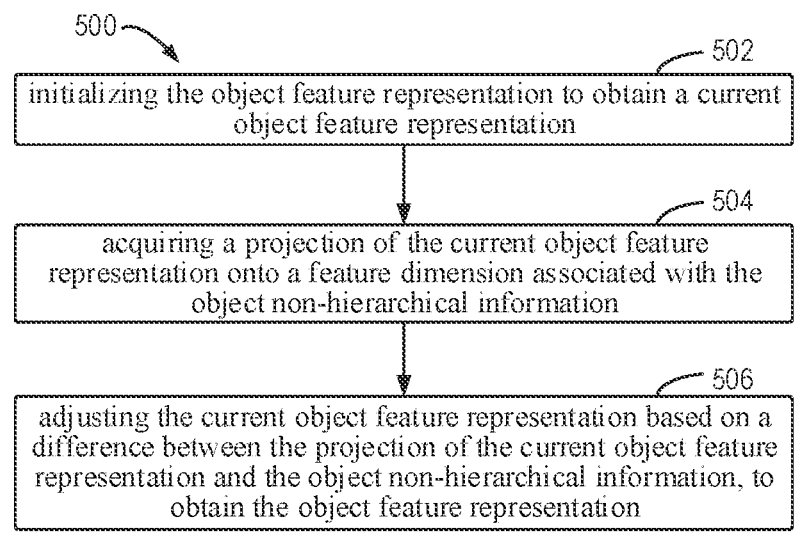
FIG. 5 illustrates a flowchart of a process of determining an object feature representation according to an embodiment of the present disclosure.

For step 206, additionally or alternatively, the auxiliary information may also include object non-hierarchical information indicating non-hierarchical attributes of the respective objects in the object set. FIG. 5 illustrates a flowchart of a method 500 for determining an object feature representation according to an embodiment of the present disclosure.

At step 502, the computing device 120 initializes the object feature representation to obtain a current object feature representation. In some embodiments, the computing device 120 may set an initialization value for the object feature representation as a starting point for adjusting a value, in a case where the objective function of the matrix decomposition is solved.

At step 504, the computing device acquires a projection of the current object feature representation onto a feature dimension associated with the object non-hierarchical information. In some embodiments, the object non-hierarchical information may be represented as $Y \in \mathbb{R}^{d_y \times m}$, in the process of matrix decomposition, the object feature representation V(j, :) and the non-hierarchical information Y(:, j) describe the same object $v_j$, thus V(j, :) and Y(:, j) should be close in the same feature space. Based on the above idea, considering the object non-hierarchical information Y, the objective function of the matrix decomposition can be transformed into:

$$\min_{U,V} \|M \odot (R - UV)\|_F^2 + \lambda(\|U\|_F^2 + \|V\|_F^2) + \theta \|S^v V - Y\|_F^2 \quad (7)$$

wherein $S_v \in \mathbb{R}^{d_y \times d}$ represents a projection matrix that projects the object feature representation V onto the same feature dimension as the object non-hierarchical information Y, and θ represents a corresponding weight coefficient. In the matrix decomposition process, the computing device 120 needs to solve $S^v$ so that the projection $S^u V$ of the object feature representation V on the same feature dimension as the object non-hierarchical information Y is at a minimum distance from the object non-hierarchical information Y.

At step 506, the computing device 120 adjusts the current object feature representation based on difference between the projection of the current object feature representation and the object non-hierarchical information, to obtain the object feature representation. In some embodiments, in the process of solving the objective function (7), the computing device 120 may employ a gradient descent method to reduce the difference between the projection $S^u V$ of the adjusted object feature representation and the object non-hierarchical information Y, thereby causing the value of the objective function (7) to decrease until a convergence condition is satisfied. In some embodiments, the convergence condition may be that the value of the objective function (7) is smaller than a predetermined threshold. In some embodiments, the convergence condition may be that the number of adjustment exceeds the number of thresholds. In some embodiments, the convergence condition may also be that the difference between the objective functions before and after the adjustment of the parameter is judged to be smaller than a predetermined threshold.

In response to determining that the objective function (7) satisfies the convergence condition, the computing device 120 may output the corresponding user feature representation U and object feature representation V. At this time, not only that the Hadamard product of the user feature representation U and the object feature representation V needs to be close enough to the preference matrix R, but also that the value of the object feature representation V in the same feature dimension should be close to the known object non-hierarchical information Y, are considered in the matrix decomposition.

In some embodiments, similar to the user non-hierarchical information X, the computing device 130 may also utilize a marginalized denoising autoencoder (MDA) to process the object non-hierarchical information Y, thereby avoiding the problem that the object non-hierarchical information Y is too sparse, and further improving the accuracy of the recommendation.

In some embodiments, the computing device 120 may also consider both the user non-hierarchical information X and the object non-hierarchical information Y. For example, the objective function of the matrix decomposition may be further expressed as:

$$\min_{U,V,S^u,W^u,S^v,W^v} \|M \odot (R - UV)\|_F^2 + \lambda(\|U\|_F^2 + \|V\|_F^2) + \quad (8)$$
$$\gamma(\|S^u U^T - W^u X\|_F^2 + \|\overline{X} - W^u \tilde{X}\|_F^2) + \theta(\|S^v V - W^v Y\|_F^2 + \|\overline{Y} - W^v \tilde{Y}\|_F^2)$$

wherein $W^y \in \mathbb{R}^{d_y \times d_s}$ represents a mapping matrix for the object non-hierarchical information Y, $\overline{Y}=[Y, Y, \ldots, Y] \in \mathbb{R}^{d_y \times mk}$, $\tilde{Y}=[\tilde{Y}_1, \tilde{Y}_2, \ldots, \tilde{Y}_k] \in \mathbb{R}^{d_y \times mk}$, and $\tilde{Y}_j$ represents the j-th noisy version of the feature Y.

In the objective function given by the equation (8), the computing device 120 needs to adjust the parameters so that the following conditions are simultaneously satisfied: (1) the Hadamard product of the user feature representation U of the user set and the object feature representation V of the object set is close to the preference matrix R; (2) the projection of the user feature representation U of the user set onto the feature dimension of the user non-hierarchical information X is close to a feature representation $W^u X$ after the self-encoding processing; (3) $\tilde{X}$ is close to the feature representation $W^u X$ after the self-encoding processing; (4) the projection of the object feature representation V of the object set onto the feature dimension of the object non-hierarchical information Y is close to a feature representation $W^u Y$ after the self-encoding processing; and (5) $\overline{Y}$ is close to the feature representation $W^u \tilde{Y}$ after the self-encoding processing. Thus, the computing device 120 is able to determine more accurate user feature representation U and object feature representation V.

In some embodiments, the auxiliary information may additionally or alternatively include object hierarchical information. The object hierarchical information indicates a plurality of attributes, which have a hierarchical relationship, of respective objects in an object set, and the plurality of attributes are constructed as a plurality of hierarchies. Continuing with the example of FIG. 3, the hierarchical information 330 of the book 310 may indicate that the book 330 has the following attributes (novel 332, historical novel 336 and political novel 338). As shown in FIG. 3, the novel 332 is a parent node having a plurality of child nodes, such as an inference novel 334 and a historical novel 336. The historical novel 336 is further the parent node of the political novel 338.

Figure 6:
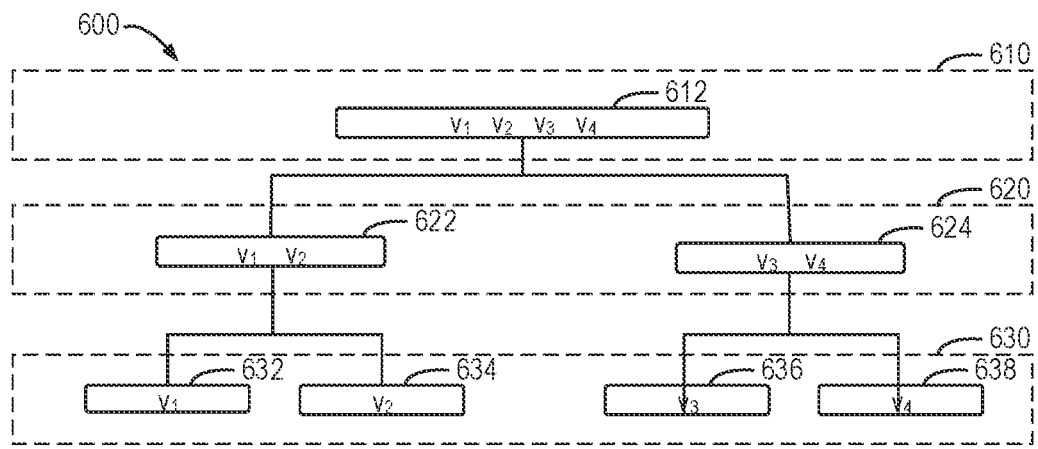
FIG. 6 illustrates a schematic diagram of example hierarchical information according to an embodiment of the present disclosure.

In some embodiments, a tree structure may be utilized to represent hierarchical information for the object set. For example, FIG. 6 illustrates a schematic diagram of example object hierarchical information 600 according to an embodiment of the present disclosure. As shown in FIG. 6, taking the object hierarchical information 600 for the object set as an example, the object set includes four objects $v_1$, $v_2$, $v_3$ and $v_4$, and the object hierarchical information 600 includes a plurality of object hierarchies 610, 620, and 630, and each object hierarchy includes one or more nodes. For example, the object hierarchy 630 includes nodes indicating four objects in the object set: $v_1$ 632, $v_2$ 634, $v_3$ 636 and $v_4$ 638. The object hierarchy 620 includes nodes that indicate two different categories: $v_1 v_2$ 622 and $v_3 v_4$ 624, which indicates that the objects $v_1$ 632 and $v_2$ 634 both belong to the category 622, and the objects $v_3$ 636 and $v_4$ 638 both belong to the category 624 (e.g., they all have the attribute of "historical novel"). The object hierarchy 610 includes nodes that indicate one category: $v_1 v_2 v_3 v_4$ 612, which indicates that the objects $v_1$ 632, $v_2$ 634, $v_3$ 636 and $v_4$ 638 all belong to a general category 612 (e.g., they all have the attribute of "novel").

In some embodiments, a matrix $T^k \in \mathbb{R}^{m_{k-1} \times m_k}$ may be utilized to indicate such a hierarchical relationship, where $T^k$ represents a parent-child relationship between a node in the k-th hierarchy and a node in the (k+1)-th hierarchy in the object hierarchy information 600. Specifically, $T^k(i,j)=1$ indicates that the i-th category in the k-th layer is the child node of the j-th category in the (k+1)-th layer. For example, for the example shown in FIG. 6, and $T^2 \in \mathbb{R}^{2 \times 1}$, and $T^2(1,1)=1$, $T^2(2,1)=1$. Therefore, the object hierarchical information may be represented as $\mathcal{T}=\{T^1, T^2, \ldots, T^q\}$, wherein it is assumed that there are q object hierarchies. For example, in the object hierarchical information shown in FIG. 6, q is equal to 3.

Figure 7:
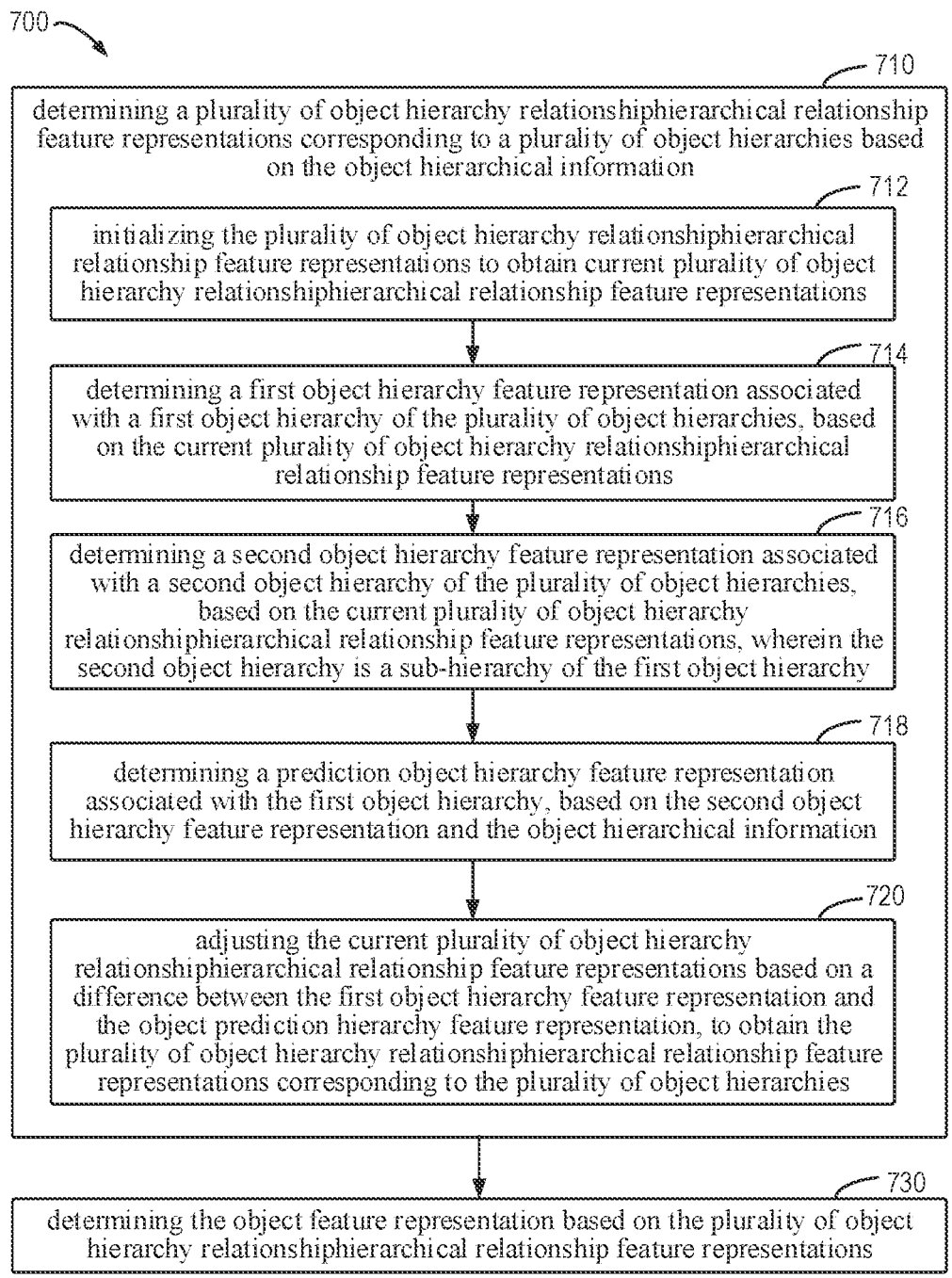
FIG. 7 illustrates a flowchart of a process of determining an object feature representation according to an embodiment of the present disclosure.
Figure 8:
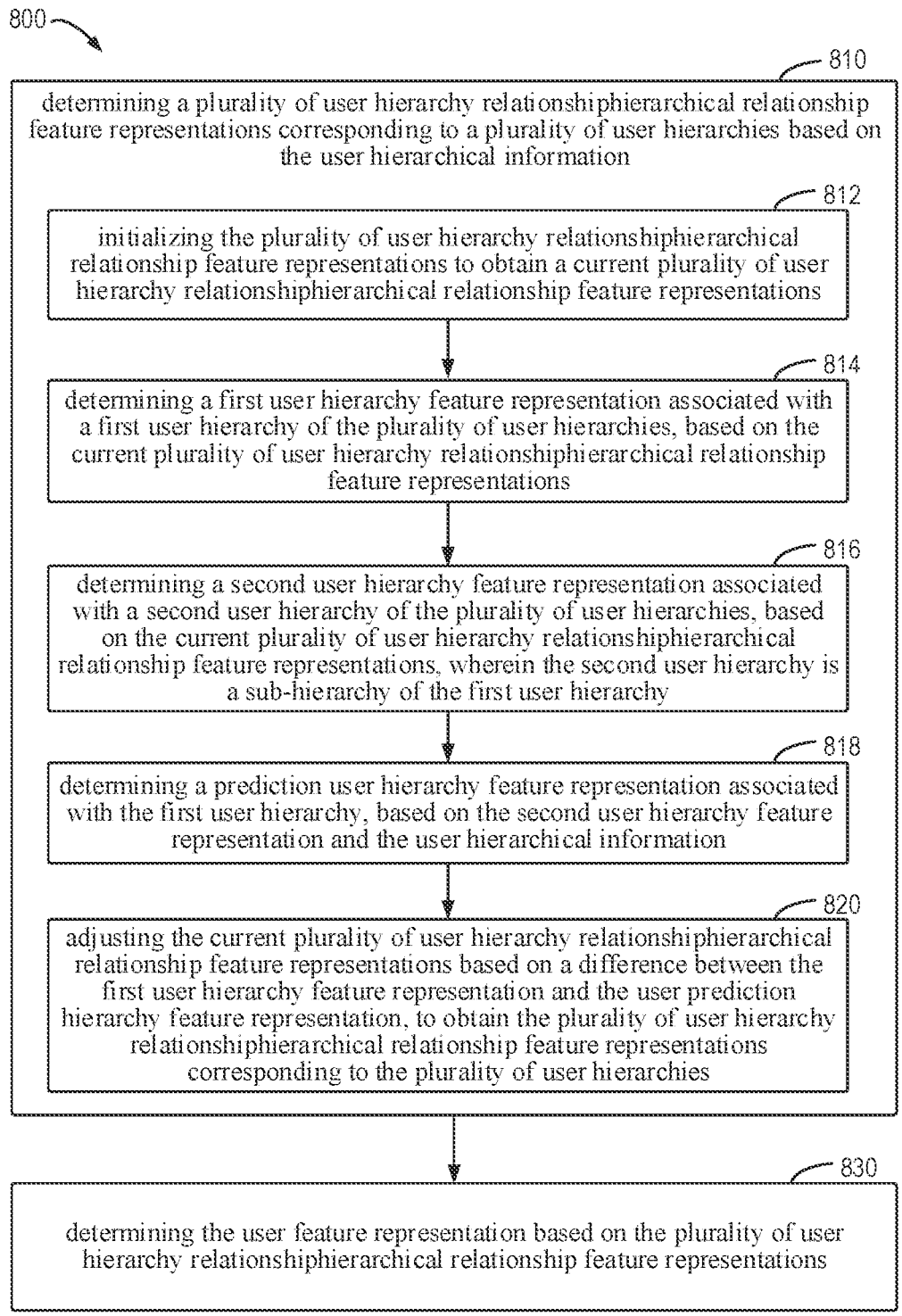
FIG. 8 illustrates a flowchart of a process of determining a user feature representation according to an embodiment of the present disclosure.

For the embodiment in which the auxiliary information includes object hierarchical information, a flowchart of a process 700 of determining the object feature representation according to an embodiment of the present disclosure will be described below in conjunction with FIG. 7.

At step 710, the computing device 120 determines a plurality of object hierarchical relationship feature representations corresponding to the plurality of object hierarchies, based on the object hierarchical information. In some embodiments, as to the object feature representation $V \in \mathbb{R}^{d \times m}$, in order to introduce known hierarchy information, V may be decomposed into two matrices $V^1 \in \mathbb{R}^{m_1 \times m}$ and $V^{2f} \in \mathbb{R}^{d \times m_1}$, $V \approx V^{2f} V^1$. It is assumed that $m_1$ nodes (or categories) are included in a second object hierarchy, thus the object hierarchical relationship feature representation $V^1$ indicates the parent-child relationship between $m_1$ categories in the second object hierarchy and m objects in the first object hierarchy. Further, $V^{2f}$ gives a feature representation of the $m_1$ categories. Similarly, in a case where the object hierarchical information includes more than two object hierarchies, $V^{2f}$ can be further decomposed into $V^{2f} \approx V^{3f} V^2$, wherein the object hierarchical relationship feature representation $V^2 \in \mathbb{R}^{m_2 \times m_1}$ represents the parent-child relationship of the categories in the second object hierarchy and the third object hierarchy. In a case where q object hierarchies are included in the object hierarchical information, the above process may be repeated q times, so that the object feature representation V may be decomposed into q object hierarchical relationship feature representations:

$$V \approx V^q \ldots V^3 V^2 V^1 \qquad (9)$$

wherein, $V^i \in \mathbb{R}^{m_i \times m_{i-1}} (1 \le i < q)$, $v^q \in \mathbb{R}^{d \times mm_{q-1}}$, and $m_0 = m$. Thus, the problem of solving the object feature representation V can be transformed into how to solve the q object hierarchical relationship feature representations.

In particular, the determining the plurality of object hierarchical relationship feature representations corresponding to the plurality of object hierarchies includes: at step 712, the computing device 120 sets initialization values of the plurality of object hierarchical relationship feature representations to obtain initialization values of a current plurality of object hierarchical relationship feature representations. In some embodiments, the computing device 120 may set initialization values for a plurality of object hierarchical relationship feature representations as starting points for adjusting values, in a case where the objective function of the matrix decomposition is solved.

At step 714, the computing device 120 determines a first object hierarchy feature representation associated with a first object hierarchy of the plurality of object hierarchies, based on the current plurality of object hierarchical relationship feature representations. For example, for the i-th object hierarchy of the plurality of object hierarchies, its object hierarchy feature representations $V^{fi}$ can be represented as $V^q \ldots V^i$.

At step 716, the computing device 120 determines a second object hierarchy feature representation associated with a second object hierarchy of the plurality of object hierarchies based on the current plurality of object hierarchical relationship feature representations, and the second object hierarchy is a sub-hierarchy of the first object hierarchy. For example, for the next object hierarchy of the i-th object hierarchy in the plurality of object hierarchies: the (i−1)-th object hierarchy, its object hierarchy feature representation $V^{i-1'}$ can be represented as $V^q \ldots V^{i-1}$.

At step 718, the computing device 120 determines a prediction object hierarchy feature representation associated with the first object hierarchy, based on the second object hierarchy feature representation and the object hierarchical information. For example, in the case where the object hierarchical information $\mathcal{T} = \{T^1, T^2, \ldots, T^q\}$ is known, the prediction object hierarchy feature representation $V^q \ldots V^{i-1}Q^{i-1}$ for the i-th object hierarchy may be determined based on the object hierarchy feature representation $V^{i-1'}$ of the (i−1)-th object hierarchy, wherein $Q^k$ is a normalized representation of $T^k$, wherein:

$$Q^k(i,j) = \frac{T^k(i,j)}{\sum_{i=1}^{m_{k-1}} T^k(i,j)} \tag{10}$$

At step 720, the computing device 120 adjusts the current plurality of object hierarchical relationship feature representations based on a difference between the first object hierarchy feature representation and the object prediction hierarchy feature representation, to obtain a plurality of object hierarchical relationship feature representations corresponding to the plurality of object hierarchies. In some embodiments, in order to enable the object feature representation V to conform as much as possible to the known object hierarchical information, the computing device 120 may adjust a plurality of object hierarchical relationship feature representations $V^q, \ldots V^3, V^2$ and $V^1$ so that the first object hierarchy feature representation obtained through decomposition is made as close as possible to the prediction object hierarchy feature representation determined based on the object hierarchical information. In some embodiments, the computing device 120 may also be configured by making a sum of the object hierarchy feature representations for all of the plurality of object hierarchies as close as possible to a sum of object prediction hierarchy feature representations. That is, for solving the object feature representation V, the computing device 120 may add the following constraints to obtain the plurality of object hierarchical relationship feature representations $V^q, \ldots V^3, V^2$ and $V^1$ corresponding to a plurality of hierarchies:

$$\min \sum_{i=2}^{q} \| V^q \ldots V^i - V^q \ldots V^{i-1}Q^{i-1} \|_F^2 \tag{11}$$

In some embodiments, in the process of solving the objective function (11), the computing device 120 may employ a gradient descent method to reduce the difference between the adjusted first object hierarchy feature representation and the object prediction hierarchy feature representation, thereby causing the value of the objective function (11) to decrease until a convergence condition is satisfied. In some embodiments, the convergence condition may be that the value of the objective function (11) is smaller than a predetermined threshold. In some embodiments, the convergence condition may be that the number of adjustment exceeds the number of thresholds. In some embodiments, the convergence condition may also be that the difference between the objective functions before and after the adjustment of the parameter is judged to be smaller than a predetermined threshold.

After the plurality of object hierarchical relationship feature representations are determined, step 730 is executed in which the computing device 120 determines an object feature representation based on the plurality of object hierarchical relationship feature representations. As discussed above, after the plurality of object hierarchical relationship feature representations $V^q, V^3, V^2$ and $V^1$ are determined, the object feature representation V may be determined according to the equation (9). In this manner, in solving the user feature representation U and the object feature representation V, the computing device 120 further considers that the object feature representation V should conform to known hierarchical information, thereby further improving the accuracy of the recommendation.

For step 206, as an alternative or additional solution, the auxiliary information may include user hierarchy information indicating a plurality of attributes, which have a hierarchical relationship, of the respective users in the user set, and the plurality of attributes of the respective users are constructed as a plurality of hierarchies. A process 800 of determining a user feature representation and an object feature representation according to an embodiment of the present disclosure will be described below with reference to FIG. 8. It should be appreciated that the process 800 is similar to the process 700 described above in connection with FIG. 7.

At step 810, the computing device 120 determines a plurality of user hierarchical relationship feature representations corresponding to the plurality of user hierarchies, based on the user hierarchical information. In some embodiments, similar to the process described above for the object hierarchical information, in a case where the user hierarchy information includes p user hierarchies, the user feature representation U can be decomposed into p user hierarchical relationship feature representations:

$$U \approx U^1 U^2 \ldots U^p \tag{12}$$

Thus, the problem of solving the user feature representation U can be transformed into how to solve the p user hierarchical relationship feature representations.

In particular, the determining the plurality of user hierarchical relationship feature representations corresponding to the plurality of user hierarchies includes: at step 812, the computing device 120 sets initialization values of the plurality of user hierarchical relationship feature representations to obtain initialization values of a current plurality of user hierarchical relationship feature representations. In some embodiments, the computing device 120 may set initialization values for a plurality of user hierarchical relationship feature representations as starting points for adjusting values, in a case where the objective function of the matrix decomposition is solved.

At step 814, the computing device 120 determines a first user hierarchy feature representation associated with a first user hierarchy of the plurality of user hierarchies, based on the current plurality of user hierarchical relationship feature representations. For example, for the i-th user hierarchy of the plurality of user hierarchies, its user hierarchy feature representation $U^{i'}$ can be represented as $U^i \ldots U^p$.

At step 816, the computing device 120 determines a second user hierarchy feature representation associated with a second user hierarchy of the plurality of user hierarchies, based on the current plurality of user hierarchical relationship feature representations, and the second user hierarchy is a sub-hierarchy of the first user hierarchy. For example, for the next user hierarchy of the i-th user hierarchy in the plurality of user hierarchies: the (i−1)-th user hierarchy, its user hierarchy feature representation $U^{i-1'}$ can be represented as $U^{i-1} \ldots U^p$.

At step 818, the computing device 120 determines a prediction user hierarchy feature representation associated with the first user hierarchy, based on the second user hierarchy feature representation and the user hierarchical information. For example, in the case where the user hierarchical information is known, the prediction user hierarchy feature representation $P^{i-1}U^{i-1} \ldots U^p$ for the i-th user hierarchy may be determined based on the user hierarchy feature representation $U^{i-1'}$ of the (i−1)-th user hierarchy, wherein is a normalized representation of the user hierarchy information $C^k$, wherein:

$$P^k(i,j) = \frac{c^k(i,j)}{\sum_{j=1}^{n_{k-1}} c^k(i,j)} \quad (13)$$

At step 820, the computing device 120 adjusts the current plurality of user hierarchical relationship feature representations based on a difference between the first user hierarchy feature representation and the user prediction hierarchy feature representation, to obtain a plurality of user hierarchical relationship feature representations corresponding to the plurality of user hierarchies. In some embodiments, in order to enable the user feature representation U to conform as much as possible to the known user hierarchy information, the computing device 120 may adjust a plurality of hierarchical relationship feature representations $U^p, \ldots, U^2$ and $U^1$ so that the first user hierarchy feature representation obtained through decomposition is made as close as possible to the prediction user hierarchy feature representation determined based on the user hierarchical information. In some embodiments, the computing device 120 may also be configured by making a sum of the user hierarchy feature representations for all of the plurality of user hierarchies as close as possible to a sum of prediction user hierarchy feature representations. That is, for solving the user feature representation U, the computing device 120 may add the following constraints to obtain the plurality of user hierarchical relationship feature representations $U^p, \ldots, U^2$ and $U^1$ corresponding to a plurality of hierarchies:

$$\min \sum_{i=2}^{p} \left\| U^i \ldots U^p - P^{i-1}U^{i-1} \ldots U^p \right\|_F^2 \quad (14)$$

In some embodiments, in the process of solving the objective function (14), the computing device 120 may employ a gradient descent method to reduce the difference between the adjusted first user hierarchy feature representation and the user prediction hierarchy feature representation, thereby causing the value of the objective function (11) to decrease until a convergence condition is satisfied. In some embodiments, the convergence condition may be that the value of the objective function (11) is smaller than a predetermined threshold. In some embodiments, the convergence condition may be that the number of adjustment exceeds the number of thresholds. In some embodiments, the convergence condition may also be that the difference between the objective functions before and after the adjustment of the parameter is judged to be smaller than a predetermined threshold.

After the plurality of user hierarchical relationship feature representations are determined, step 830 is executed in which the computing device 120 determines a user feature representation based on the plurality of user hierarchical relationship feature representations. As discussed above, after the plurality of user hierarchical relationship feature representations $U^p, \ldots, U^2$ and $U^1$ are determined, the user feature representation U may be determined according to the equation (12). In this manner, in solving the user feature representation U and the object feature representation V, the computing device 120 further considers that the user feature representation U should conform to the known user hierarchy information, thereby further improving the accuracy of the recommendation.

In some embodiments, the auxiliary information may include both hierarchical information and non-hierarchical information. In a specific example, in a case where the auxiliary information includes user hierarchy information, user non-hierarchical information, object hierarchical information, and object non-hierarchical information, based on the above discussion, the objective function of the matrix decomposition model may be represented as:

$$\begin{aligned}\min_{\substack{U^1,\ldots,U^p \\ V^1,\ldots,V^q \\ S^u,W^u,S^v,W^v}} & \left\| M \odot (R - U^1 \ldots U^p V^q \ldots V^1) \right\|_F^2 + \\ & \gamma \left( \left\| S^u U^T - W^u X \right\|_F^2 + \left\| \overline{X} - W^u \hat{X} \right\|_F^2 \right) + \\ & \theta \left( \left\| S^v V - W^v Y \right\|_F^2 + \left\| \overline{Y} - W^v \hat{Y} \right\|_F^2 \right) + \\ & \alpha \sum_{i=2}^{p} \left\| U^i \ldots U^p - \hat{C}^{i-1} U^{i-1} \ldots U^p \right\|_F^2 + \\ & \beta \sum_{i=2}^{q} \left\| V^q \ldots V^i - V^q \ldots V^{i-1} \hat{T}^{i-1} \right\|_F^2 + \lambda \left( \sum_{i=2}^{p} \left\| U^i \right\|_F^2 + \sum_{i=2}^{q} \left\| V^i \right\|_F^2 \right) \end{aligned} \quad (15)$$

wherein γ and θ are weight coefficients for the user non-hierarchical information and the object non-hierarchical information respectively, and α and β are weight coefficients for the user hierarchy information and the object hierarchical information respectively.

Based on the objective function (15), the computing device 120 may determine $U^1, \ldots, U^p, V^1, \ldots V^q, S^u, W^u$, $S^v$和$W^v$ that minimize the objective function (16), using a gradient descent method. Based on the above method, in making recommendations using matrix decomposition, the computing device 120 considers both hierarchical information and non-hierarchical information for the user/object set, fully utilizes various attributes of the user/object itself, and improves the accuracy of feature representation.

How to determine the user feature representation and the object feature representation based on the evaluation information and the auxiliary information is discussed above. Continuing to refer to FIG. 2, at step 208, the computing device 120 determines a preference prediction value of a target user in a user set for a target object in an object set based on the user feature representation and the object feature representation, wherein a preference value of the target user for the target object is not indicated in the evaluation information. In some embodiments, after determining the user feature representation U and the object feature representation V by solving the objective function, the computing device 120 may compute a matrix product of U and V, and determine the preference prediction value of the target user for the target object based on the matrix product. For example, in the example of FIG. 1, the computing device 120 may determine the preference values, which are not indicated in the evaluation information 110, of the user 1 for the object m and the user 2 for the object m based on the user feature representation U and the object feature representation V solved by feature decomposition. For example, the preference prediction value 132 and the preference prediction value 134 may be filled into the original preference matrix to obtain the updated evaluation information 130, thereby obtaining preference values of all users in the user set for all objects in the object set.

In some embodiments, the computing device 120 may utilize the updated evaluation information 130 to recommend an object in the object set to a target user in the user set. In some embodiments, the computing device 120 may recommend an object having a preference value greater than a predetermined threshold to the target user. In some embodiments, the computing device 120 may also determine a preference ranking according to the preferences of a plurality of objects associated with the target user, and select an object with a higher preference ranking for recommendations. It should be understood that such recommendations are exemplary only and are not intended to limit the scope of the present disclosure.

Figure 9:
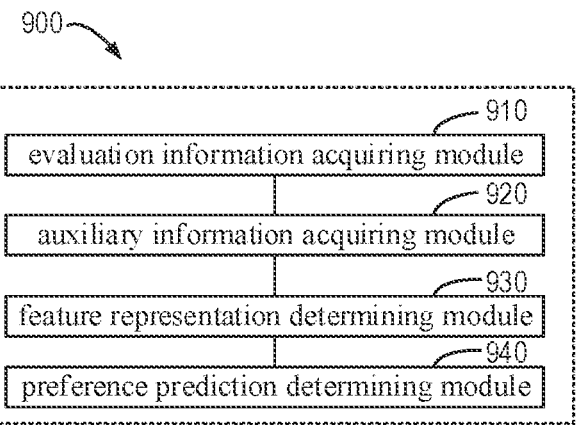
FIG. 9 illustrates a schematic block diagram of an apparatus for object preference prediction according to an embodiment of the present disclosure.

FIG. 9 illustrates a block diagram of an apparatus 900 for object preference prediction according to an embodiment of the present disclosure. The apparatus 900 may be included in the computing device 120 of FIG. 1 or implemented as the computing device 120. As shown in FIG. 9, the apparatus 900 includes an evaluation information acquiring module 910 configured to acquire evaluation information indicating preference values of partial users in a user set for partial objects in an object set. The apparatus 900 further includes an auxiliary information acquiring module 920 configured to acquire auxiliary information of at least one of the user set and the object set, wherein the auxiliary information indicates an attribute of at least one of a corresponding user in the user set and a corresponding object in the object set. The apparatus 900 further includes a feature representation determining module 930 configured to determine a user feature representation and an object feature representation using a matrix decomposition model, based on the evaluation information and the auxiliary information. Moreover, the apparatus 900 further includes a preference prediction determining module 940 configured to determine a preference prediction value of a target user in the user set for a target object in the object set based on the user feature representation and the object feature representation, wherein a preference value of the target user for the target object is not indicated in the evaluation information.

In some embodiments, the auxiliary information includes object non-hierarchical information indicating non-hierarchical attributes of the respective objects in the object set, and the feature representation determining module 930 includes: a first initialization module configured to set an initialization value of an object feature representation to obtain a current object feature representation; a first projection acquiring module configured to acquire a projection of the current object feature representation onto a feature dimension associated with the object non-hierarchical information; and a first adjustment module configured to adjust the current object feature representation based on a difference between the projection of the current object feature representation and the object non-hierarchical information, to obtain the object feature representation.

In some embodiments, the auxiliary information includes object hierarchical information indicating a plurality of attributes, which have a hierarchical relationship, of the respective objects in the object set, the plurality of attributes of the respective objects are constructed as a plurality of object hierarchies, and the feature representation determining module 930 includes: an object hierarchical relationship feature representation determining module configured to determine a plurality of object hierarchical relationship feature representations corresponding to the plurality of object hierarchies based on the object hierarchical information; and an object feature representation determining module configured to determine the object feature representation based on the plurality of object hierarchical relationship feature representations.

In some embodiments, the object hierarchical relationship feature representation determining module includes: a second initialization module configured to initialize the plurality of object hierarchical relationship feature representations to obtain a current plurality of object hierarchical relationship feature representations; a first object hierarchy feature representation determining module configured to determine a first object hierarchy feature representation associated with a first object hierarchy of the plurality of object hierarchies, based on the current plurality of object hierarchical relationship feature representations; a second object hierarchy feature representation determining module configured to determine a second object hierarchy feature representation associated with a second object hierarchy of the plurality of object hierarchies, based on the current plurality of object hierarchical relationship feature representations, wherein the second object hierarchy is a sub-hierarchy of the first object hierarchy; a prediction object hierarchy representation determining module configured to determine a prediction object hierarchy feature representation associated with the first object hierarchy, based on the second object hierarchy feature representation and the object hierarchical information; and a second adjustment module configured to adjust the current plurality of object hierarchical relationship feature representations based on a difference between the first object hierarchy feature representation and the object prediction hierarchy feature representation, to obtain the plurality of object hierarchical relationship feature representations corresponding to the plurality of object hierarchies.

In some embodiments, the auxiliary information includes user non-hierarchical information indicating non-hierarchical attributes of the respective users in the user set, and the feature representation determining module 930 includes: a third initialization module configured to initialize the user feature representation to obtain a current user feature representation; a second projection acquiring module configured to acquire a projection of the current user feature representation onto a feature dimension associated with the user non-hierarchical information; and a third adjustment module configured to adjust the current user feature representation based on a difference between the projection of the current user feature representation and the user non-hierarchical information, to obtain the user feature representation.

In some embodiments, the auxiliary information includes user hierarchical information indicating a plurality of attributes, which have a hierarchical relationship, of the respective users in the user set, and the feature representation determining module 930 includes: a user hierarchical relationship feature representation determining module configured to determine a plurality of user hierarchical relationship feature representations corresponding to the plurality of user hierarchies based on the user hierarchical information; and a user feature representation determining module configured to determine the user feature representation based on the plurality of user hierarchical relationship feature representations.

In some embodiments, the user hierarchical relationship feature representation determining module includes: a fourth initialization module configured to initialize the plurality of user hierarchical relationship feature representations to obtain a current plurality of user hierarchical relationship feature representations; a first user hierarchy feature representation determining module configured to determine a first user hierarchy feature representation associated with a first user hierarchy of the plurality of user hierarchies, based on the current plurality of user hierarchical relationship feature representations; a second user hierarchy feature representation determining module configured to determine a second user hierarchy feature representation associated with a second user hierarchy of the plurality of user hierarchies, based on the current plurality of user hierarchical relationship feature representations, wherein the second user hierarchy is a sub-hierarchy of the first user hierarchy; a prediction user hierarchy representation determining module configured to determine a prediction user hierarchy feature representation associated with the first user hierarchy, based on the second user hierarchy feature representation and the user hierarchical information; and a fourth adjustment module configured to adjust the current plurality of user hierarchical relationship feature representations based on a difference between the first user hierarchy feature representation and the user prediction hierarchy feature representation, to obtain the plurality of user hierarchical relationship feature representations corresponding to the plurality of user hierarchies.

In some embodiments, the preference prediction determining module 940 further includes: a matrix product calculation module configured to calculate a matrix product of the user feature representation and the object feature representation; and a preference prediction value determining module configured to determine the preference prediction value of the target user for the target object based on the matrix product.

In some embodiments, the apparatus 900 further includes a recommendation module configured to recommend an object in the object set to the target user, based on the evaluation information and the preference prediction value.

Figure 10:
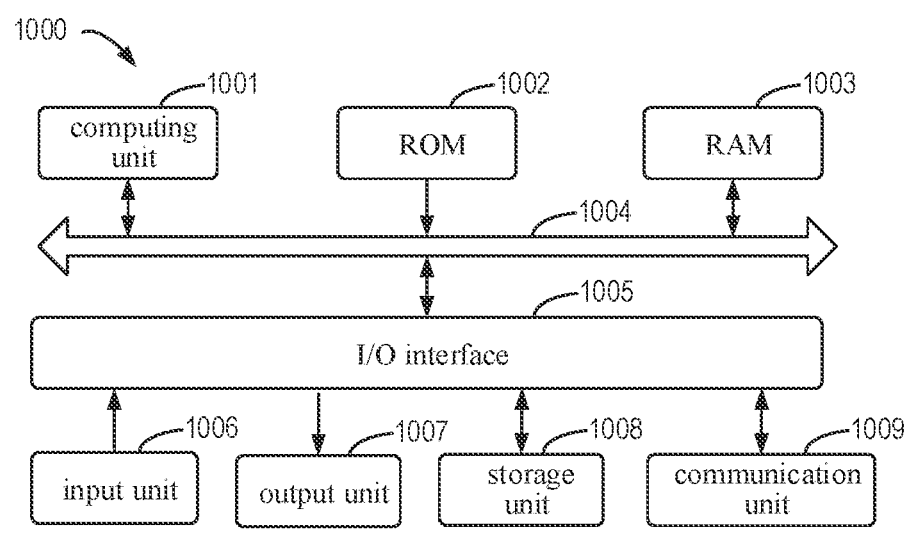
FIG. 10 illustrates a schematic block diagram of an example device that may be used to implement an embodiment of the present disclosure.

FIG. 10 illustrates a schematic block diagram of an example device 1000 that may be used to implement the embodiments of the present disclosure. For example, the computing device 120 shown in FIG. 1 is implemented by the device 1000. As shown, the device 1000 includes a central processing unit (CPU) such as a computing unit 1001 which may perform various appropriate actions and processing based on computer program instructions stored in a read only memory (ROM) 1002 or computer program instructions loaded from a storage unit 1008 into a random access memory (RAM) 1003. In the RAM 1003, various programs and data required for the operation of the device 1000 may also be stored. The CPU 1001, the ROM 1002, and the RAM 1003 are connected to each other through a bus 1004. An input/output (I/O) interface 1005 is also connected to the bus 1004.

A plurality of components in the device 1000 are connected to the I/O interface 1005, including an input unit 1006 such as a keyboard, a mouse, etc., an output unit 1007 such as various types of displays, speakers, etc., a storage unit 1008 such as a magnetic disk, an optical disk, etc., and a communication unit 1009 such as a network card, a modem, a wireless communication transceiver or the like. The communication unit 1009 allows the device 1000 to exchange information/data with other devices through a computer network such as the Internet and/or various telecommunication networks.

Various processes and processing described above, such as the method 200, the method 400, the method 500, the method 700, and/or the method 800, may be performed by the computing unit 1001. For example, in some embodiments, the method 200, the method 400, the method 500, the method 700, and/or the method 800 may be implemented as a computer software program that is tangibly embodied in a machine readable medium, such as a storage unit 1008. In some embodiments, part or all of the computer program may be loaded and/or installed onto the device 1000 via the ROM 1002 and/or the communication unit 1007. In a case where the computer program is loaded into the RAM 1003 and executed by the CPU 1001, one or more actions of the method 200, the method 400, the method 500, the method 700, and/or the method 800 described above may be performed.

The present disclosure may be a method, an apparatus, a system, and/or a computer program product. The computer program product may include a computer readable storage medium having computer readable program instructions carried thereon for performing various aspects of the present disclosure.

Various embodiments of the present disclosure have been described above, and the above description is exemplary, not exhaustive, and is not limited to the disclosed various embodiments. Many modifications and variations will be apparent to persons skilled in the art without departing from the scope and spirit of the illustrated various embodiments. The choice of terms used herein is intended to best explain the principles of the various embodiments, practical applications or improvements to technology in the marketplace, or to enable other persons skilled in the art to understand the various embodiments disclosed herein.

The invention claimed is:

1. A method for object preference prediction, comprising:
  acquiring evaluation information indicating preference values of partial users in a user set for partial objects in an object set; wherein the evaluation information is represented as a preference matrix;
  acquiring auxiliary information of at least one of the user set and the object set, wherein the auxiliary information indicates an attribute of at least one of a corresponding user in the user set and a corresponding object in the object set;
  determining a user feature representation and an object feature representation using a matrix decomposition model, based on the evaluation information and the auxiliary information; and
  determining a preference prediction value of a target user in the user set for a target object in the object set based on the user feature representation and the object feature representation, wherein a preference value of the target user for the target object is not indicated in the evaluation information,
  wherein the auxiliary information comprises at least one of object non-hierarchical information, object hierarchical information, user non-hierarchical information and user hierarchical information,
  the object non-hierarchical information indicates non-hierarchical attributes of the respective objects in the object set, the object hierarchical information indicates a plurality of attributes, which have a hierarchical relationship, of the respective objects in the object set, the user non-hierarchical information indicates non-hierarchical attributes of the respective users in the user set, and the user hierarchical information indicates a plurality of attributes, which have a hierarchical relationship, of the respective users in the user set;

wherein the auxiliary information comprises the object non-hierarchical information, and wherein the determining the user feature representation and the object feature representation, comprises:

initializing the object feature representation to obtain a current object feature representation;

acquiring a projection of the current object feature representation onto a feature dimension associated with the object non-hierarchical information; and adjusting the current object feature representation based on a difference between the projection of the current object feature representation and the object non-hierarchical information, to obtain the object feature representation;

wherein an objective function of matrix decomposition is $$\min_{U,V}\|M\odot(R-UV)\|_F^2+\lambda(\|U\|_F^2+\|V\|_F^2)+\theta\|S^YV-Y\|_F^2;$$

wherein $M\in\mathbb{R}^{n\times m}$ represents an indication matrix of the preference matrix R associated with the evaluation information, if R(i, j)>0, M(i, j)=1; otherwise, M(i, j)=0; U indicates the user feature representation for the user set, which is acquired based on the matrix decomposition, and V indicates the object feature representation for the object set, which is acquired based on the matrix decomposition, $U\in\mathbb{R}^{n\times d}$, and $V\in\mathbb{R}^{d\times m}$; d represents a feature dimension of a single user feature representation or object feature representation; $\odot$ represents a Hadamard product, and $\lambda$ represents a weight coefficient; $S^Y\in\mathbb{R}^{d_y\times d}$ represents a projection matrix that projects the object feature representation V onto a same feature dimension as the object non-hierarchical information Y, and $\theta$ represents a corresponding weight coefficient.

2. The method according to claim 1, wherein the auxiliary information comprises the object hierarchical information, the plurality of attributes of the respective objects are constructed as a plurality of object hierarchies, and wherein the determining the object feature representation, comprises:

determining a plurality of object hierarchical relationship feature representations corresponding to the plurality of object hierarchies based on the object hierarchical information; and determining the object feature representation based on the plurality of object hierarchical relationship feature representations.

3. The method according to claim 2, wherein the determining the plurality of object hierarchical relationship feature representations corresponding to the plurality of object hierarchies, comprises:

initializing the plurality of object hierarchical relationship feature representations to obtain a current plurality of object hierarchical relationship feature representations;

determining a first object hierarchy feature representation associated with a first object hierarchy of the plurality of object hierarchies, based on the current plurality of object hierarchical relationship feature representations;

determining a second object hierarchy feature representation associated with a second object hierarchy of the plurality of object hierarchies, based on the current plurality of object hierarchical relationship feature representations, wherein the second object hierarchy is a sub-hierarchy of the first object hierarchy;

determining a prediction object hierarchy feature representation associated with the first object hierarchy, based on the second object hierarchy feature representation and the object hierarchical information; and adjusting the current plurality of object hierarchical relationship feature representations based on a difference between the first object hierarchy feature representation and the object prediction hierarchy feature representation, to obtain the plurality of object hierarchical relationship feature representations corresponding to the plurality of object hierarchies.

4. The method according to claim 1, wherein the auxiliary information comprises the user non-hierarchical information, and wherein the determining the user feature representation and the object feature representation, comprises:

initializing the user feature representation to obtain a current user feature representation;

acquiring a projection of the current user feature representation onto a feature dimension associated with the user non-hierarchical information; and adjusting the current user feature representation based on a difference between the projection of the current user feature representation and the user non-hierarchical information, to obtain the user feature representation.

5. The method according to claim 1, wherein the auxiliary information comprises the user hierarchical information, the plurality of attributes of the respective users are constructed as a plurality of user hierarchies, and wherein the determining the user feature representation and the object feature representation, comprises:

determining a plurality of user hierarchical relationship feature representations corresponding to the plurality of user hierarchies based on the user hierarchical information; and determining the user feature representation based on the plurality of user hierarchical relationship feature representations.

6. The method according to claim 5, wherein the determining the plurality of user hierarchical relationship feature representations corresponding to the plurality of user hierarchies, comprises:

initializing the plurality of user hierarchical relationship feature representations to obtain a current plurality of user hierarchical relationship feature representations;

determining a first user hierarchy feature representation associated with a first user hierarchy of the plurality of user hierarchies, based on the current plurality of user hierarchical relationship feature representations;

determining a second user hierarchy feature representation associated with a second user hierarchy of the plurality of user hierarchies, based on the current plurality of user hierarchical relationship feature representations, wherein the second user hierarchy is a sub-hierarchy of the first user hierarchy;

determining a prediction user hierarchy feature representation associated with the first user hierarchy, based on the second user hierarchy feature representation and the user hierarchical information; and adjusting the current plurality of user hierarchical relationship feature representations based on a difference between the first user hierarchy feature representation and the user prediction hierarchy feature representation, to obtain the plurality of user hierarchical relationship feature representations corresponding to the plurality of user hierarchies.

7. The method according to claim 1, wherein the determining the preference prediction value of the target user in the user set for the target object in the object set, comprises:
  calculating a matrix product of the user feature representation and the object feature representation; and
  determining the preference prediction value of the target user for the target object based on the matrix product.

8. The method according to claim 1, further comprising:
  recommending an object in the object set to the target user, based on the evaluation information and the preference prediction value.

9. An electronic device, comprising:
  at least one processor; and
  a memory connected communicatively to the at least one processor, wherein,
  the memory stores instructions that are executable by the at least one processor, and the instructions, when executed by the at least one processor, enable the at least one processor to perform operations of:
  acquiring evaluation information indicating preference values of partial users in a user set for partial objects in an object set; wherein the evaluation information is represented as a preference matrix;
  acquiring auxiliary information of at least one of the user set and the object set, wherein the auxiliary information indicates an attribute of at least one of a corresponding user in the user set and a corresponding object in the object set;
  a user feature representation and an object feature representation using a matrix decomposition model, based on the evaluation information and the auxiliary information; and
  determining a preference prediction value of a target user in the user set for a target object in the object set based on the user feature representation and the object feature representation, wherein a preference value of the target user for the target object is not indicated in the evaluation information,
  wherein the auxiliary information comprises at least one of object non-hierarchical information, object hierarchical information, user non-hierarchical information and user hierarchical information,
  the object non-hierarchical information indicates non-hierarchical attributes of the respective objects in the object set, the object hierarchical information indicates a plurality of attributes, which have a hierarchical relationship, of the respective objects in the object set, the user non-hierarchical information indicates non-hierarchical attributes of the respective users in the user set, and the user hierarchical information indicates a plurality of attributes, which have a hierarchical relationship, of the respective users in the user set;
  wherein the auxiliary information comprises the object non-hierarchical information, and wherein the determining the user feature representation and the object feature representation, comprises:
  initializing the object feature representation to obtain a current object feature representation;
  acquiring a projection of the current object feature representation onto a feature dimension associated with the object non-hierarchical information; and
  adjusting the current object feature representation based on a difference between the projection of the current object feature representation and the object non-hierarchical information, to obtain the object feature representation;

wherein an objective function of matrix decomposition is $\min_{U,V} \|M \odot (R-UV)\|_F^2 + \lambda(\|U\|_F^2 + \|V\|_F^2) + \theta \|S^v V - Y\|_F^2$;

wherein $M \in \mathbb{R}^{n \times m}$ represents an indication matrix of the preference matrix R associated with the evaluation information, if R(i, j)>0, M(i, j)=1; otherwise, M(i, j)=0; U indicates the user feature representation for the user set, which is acquired based on the matrix decomposition, and V indicates the object feature representation for the object set, which is acquired based on the matrix decomposition, $U \in \mathbb{R}^{n \times d}$, and $V \in \mathbb{R}^{d \times m}$; d represents a feature dimension of a single user feature representation or object feature representation; $\odot$ represents a Hadamard product, and $\lambda$ represents a weight coefficient; $S^v \in \mathbb{R}^{d_y \times d}$ represents a projection matrix that projects the object feature representation V onto a same feature dimension as the object non-hierarchical information Y, and $\theta$ represents a corresponding weight coefficient.

10. The electronic device according to claim 9, wherein the auxiliary information comprises the object hierarchical information, the plurality of attributes of the respective objects are constructed as a plurality of object hierarchies, and wherein the determining the object feature representation, comprises:
  determining a plurality of object hierarchical relationship feature representations corresponding to the plurality of object hierarchies based on the object hierarchical information; and
  determining the object feature representation based on the plurality of object hierarchical relationship feature representations.

11. The electronic device according to claim 10, wherein the determining the plurality of object hierarchical relationship feature representations corresponding to the plurality of object hierarchies, comprises:
  initializing the plurality of object hierarchical relationship feature representations to obtain a current plurality of object hierarchical relationship feature representations;
  determining a first object hierarchy feature representation associated with a first object hierarchy of the plurality of object hierarchies, based on the current plurality of object hierarchical relationship feature representations;
  determining a second object hierarchy feature representation associated with a second object hierarchy of the plurality of object hierarchies, based on the current plurality of object hierarchical relationship feature representations, wherein the second object hierarchy is a sub-hierarchy of the first object hierarchy;
  determining a prediction object hierarchy feature representation associated with the first object hierarchy, based on the second object hierarchy feature representation and the object hierarchical information; and
  adjusting the current plurality of object hierarchical relationship feature representations based on a difference between the first object hierarchy feature representation and the object prediction hierarchy feature representation, to obtain the plurality of object hierarchical relationship feature representations corresponding to the plurality of object hierarchies.

12. The electronic device according to claim 9, wherein the auxiliary information comprises the user non-hierarchical information, and wherein the determining the user feature representation and the object feature representation, comprises:
  initializing the user feature representation to obtain a current user feature representation;

acquiring a projection of the current user feature representation onto a feature dimension associated with the user non-hierarchical information; and adjusting the current user feature representation based on a difference between the projection of the current user feature representation and the user non-hierarchical information, to obtain the user feature representation.

13. The electronic device according to claim 9, wherein the auxiliary information comprises the user hierarchical information, the plurality of attributes of the respective users are constructed as a plurality of user hierarchies, and wherein the determining the user feature representation and the object feature representation, comprises:

determining a plurality of user hierarchical relationship feature representations corresponding to the plurality of user hierarchies based on the user hierarchical information; and determining the user feature representation based on the plurality of user hierarchical relationship feature representations.

14. The electronic device according to claim 13, wherein the determining the plurality of user hierarchical relationship feature representations corresponding to the plurality of user hierarchies, comprises:

initializing the plurality of user hierarchical relationship feature representations to obtain a current plurality of user hierarchical relationship feature representations;

determining a first user hierarchy feature representation associated with a first user hierarchy of the plurality of user hierarchies, based on the current plurality of user hierarchical relationship feature representations;

determining a second user hierarchy feature representation associated with a second user hierarchy of the plurality of user hierarchies, based on the current plurality of user hierarchical relationship feature representations, wherein the second user hierarchy is a sub-hierarchy of the first user hierarchy;

determining a prediction user hierarchy feature representation associated with the first user hierarchy, based on the second user hierarchy feature representation and the user hierarchical information; and adjusting the current plurality of user hierarchical relationship feature representations based on a difference between the first user hierarchy feature representation and the user prediction hierarchy feature representation, to obtain the plurality of user hierarchical relationship feature representations corresponding to the plurality of user hierarchies.

15. The electronic device according to claim 9, wherein the determining the preference prediction value of the target user in the user set for the target object in the object set, comprises:

calculating a matrix product of the user feature representation and the object feature representation; and determining the preference prediction value of the target user for the target object based on the matrix product.

16. The electronic device according to claim 9, wherein the instructions, when executed by the at least one processor, enable the at least one processor to further perform an operation of:

recommending an object in the object set to the target user, based on the evaluation information and the preference prediction value.

17. A non-transitory computer readable storage medium having computer readable program instructions stored thereon for executing operations of:

acquiring evaluation information indicating preference values of partial users in a user set for partial objects in an object set: wherein the evaluation information is represented as a preference matrix;

acquiring auxiliary information of at least one of the user set and the object set, wherein the auxiliary information indicates an attribute of at least one of a corresponding user in the user set and a corresponding object in the object set;

determining a user feature representation and an object feature representation using a matrix decomposition model, based on the evaluation information and the auxiliary information; and determining a preference prediction value of a target user in the user set for a target object in the object set based on the user feature representation and the object feature representation, wherein a preference value of the target user for the target object is not indicated in the evaluation information, wherein the auxiliary information comprises at least one of object non-hierarchical information, object hierarchical information, user non-hierarchical information and user hierarchical information, the object non-hierarchical information indicates non-hierarchical attributes of the respective objects in the object set, the object hierarchical information indicates a plurality of attributes, which have a hierarchical relationship, of the respective objects in the object set, the user non-hierarchical information indicates non-hierarchical attributes of the respective users in the user set, and the user hierarchical information indicates a plurality of attributes, which have a hierarchical relationship, of the respective users in the user set;

wherein the auxiliary information comprises the object non-hierarchical information, and wherein the determining the user feature representation and the object feature representation, comprises:

initializing the object feature representation to obtain a current object feature representation;

acquiring a projection of the current object feature representation onto a feature dimension associated with the object non-hierarchical information; and adjusting the current object feature representation based on a difference between the projection of the current object feature representation and the object non-hierarchical information, to obtain the object feature representation;

wherein an objective function of matrix decomposition is $$\min_{U,V} \|M \odot (R-UV)\|_F^2 + \lambda(\|U\|_F^2 + \|V\|_F^2) + \theta \|S^v V - Y\|_F^2;$$

wherein $M \in \mathbb{R}^{n \times m}$ represents an indication matrix of the preference matrix R associated with the evaluation information, if $R(i, j) > 0$, $M(i, j) = 1$; otherwise, $M(i, j) = 0$; U indicates the user feature representation for the user set, which is acquired based on the matrix decomposition, and V indicates the object feature representation for the object set, which is acquired based on the matrix decomposition, $U \in \mathbb{R}^{n \times d}$, and $V \in \mathbb{R}^{d \times m}$; d represents a feature dimension of a single user feature representation or object feature representation; $\odot$ represents a Hadamard product, and $\lambda$ represents a weight coefficient; $S^v \in \mathbb{R}^{d_y \times d}$ represents a projection matrix that projects the object feature representation V onto a same feature dimension as the object non-hierarchical information Y, and $\theta$ represents a corresponding weight coefficient.

* * * * *